US007315812B2

(12) United States Patent
Beerends

(10) Patent No.: US 7,315,812 B2
(45) Date of Patent: Jan. 1, 2008

(54) METHOD FOR DETERMINING THE QUALITY OF A SPEECH SIGNAL

(75) Inventor: John Gerard Beerends, Hengstdijk (NL)

(73) Assignee: Koninklijke KPN N.V., Groningen (NL)

( * ) Notice: Subject to any disclaimer, the term of this patent is extended or adjusted under 35 U.S.C. 154(b) by 753 days.

(21) Appl. No.: 10/471,510

(22) PCT Filed: May 21, 2002

(86) PCT No.: PCT/EP02/05556

§ 371 (c)(1), (2), (4) Date: Sep. 11, 2003

(87) PCT Pub. No.: WO02/101721

PCT Pub. Date: Dec. 19, 2002

(65) Prior Publication Data

US 2004/0138875 A1 Jul. 15, 2004

(30) Foreign Application Priority Data

Oct. 1, 2001 (EP) .................................. 01203699

(51) Int. Cl.
*G06F 21/02* (2006.01)

(52) U.S. Cl. .................................... 704/200.1; 704/200

(58) Field of Classification Search ................ 704/200, 704/200.1, 201, 205, 206, 216, 224, 258, 704/500; 379/1.01, 1.02; 381/58, 60, 98
See application file for complete search history.

(56) References Cited

U.S. PATENT DOCUMENTS 6,014,621 A * 1/2000 Chen .......................... 704/220
6,041,294 A * 3/2000 Beerends .................... 704/203
6,064,946 A * 5/2000 Beerends ...................... 702/57
6,064,966 A * 5/2000 Beerends .................... 704/500
6,594,307 B1 * 7/2003 Beerends .................... 375/224
6,594,365 B1 * 7/2003 Eatwell ...................... 381/73.1
6,985,559 B2 * 1/2006 Hardy ........................ 379/1.02
2003/0055608 A1 * 3/2003 Beerends et al. ........... 702/189
2003/0171922 A1 * 9/2003 Beerends et al. ........... 704/233

OTHER PUBLICATIONS

AA. Antony W. Rix et al, "Perceptual Evaluation of Speech Quality (PESQ)—A New Method For Speech Quality Assessment of Telephone Networks and Codecs", 2001 IEEE International Conference on Acoustics, Speech and Signal Processing, Salt Lake City, UT, May 7-11, 2001, pp. 749-752.

* cited by examiner

*Primary Examiner*—Tālivaldis Ivars Šmits
*Assistant Examiner*—Douglas C Godbold
(74) *Attorney, Agent, or Firm*—Michaelson & Associates; Peter L. Michaelson

(57) ABSTRACT

Objective measurement methods and devices for predicting perceptual quality of speech signals degraded in speech processing/transporting systems have unreliable prediction results in cases where the degraded and reference signals show in between severe timbre differences. Improvement is achieved by applying a partial compensation step within in a signal processing stage using a frequency dependently clipped compensation factor for compensating power differences between the degraded and reference signals in the frequency domain. Preferably clipping values for clipping the compensation factor have larger frequency-dependency in a range of low frequencies with respect to a centre frequency of the human auditory system, than in a range of high frequencies.

12 Claims, 4 Drawing Sheets

METHOD FOR DETERMINING THE QUALITY OF A SPEECH SIGNAL

BACKGROUND OF THE INVENTION

1. Field of the Invention

The invention lies in the area of quality measurement of sound signals, such as audio, speech and voice signals. More in particular, it relates to a method and a device for determining, according to an objective measurement technique, the speech quality of an output signal as received from a speech signal processing system, with respect to a reference signal.

2. Description of the Prior Art

Methods and devices of such a type are generally known. More particularly, methods and corresponding devices, which follow the recently accepted ITU-T Recommendation P.862 (see Reference [1]), are of such a type. According to the present known technique, an output signal from a speech signals-processing and/or transporting system, such as wireless telecommunications systems, Voice over Internet Protocol transmission systems, and speech codecs, which is generally a degraded signal and whose signal quality is to be determined, and a reference signal, are mapped on representation signals according to a psycho-physical perception model of the human hearing. As a reference signal, an input signal of the system applied with the output signal obtained may be used, as in the cited references. Subsequently, a differential signal is determined from said representation signals, which, according to the perception model used, is representative of a disturbance sustained in the system present in the output signal. The differential or disturbance signal constitutes an expression for the extent to which, according to the representation model, the output signal deviates from the reference signal. Then the disturbance signal is processed in accordance with a cognitive model, in which certain properties of human test subjects have been modelled, in order to obtain a time-independent quality signal, which is a measure of the quality of the auditive perception of the output signal.

The known technique has, however, the disadvantage that, for severe timbre differences between the reference signal and the degraded signal, the predicted speech quality of the degraded signal is not correct, or at least unreliable.

SUMMARY OF THE INVENTION

An object of the present invention is to provide for an improved method and an improved device for determining the quality of a speech signal, which do not possess said disadvantage.

Among other things the present invention has been based on the following observation. From the basics of human perception, it is known that the human auditory system follows the rule of constancy in perception, e.g. constancy of size, of pitch, of timbre etc. This means that the human auditory system in principle compensates, to a certain extent, for differences in size, or pitch, or timbre, etc.

A perceptual modelling of a kind as, e.g., used in methods and devices as known from Reference [1] takes into account a partial compensation for some severe effects by means of a partial compensation of the pitch power density of the original (i.e., the reference) signal. Such a compensation is carried out by multiplying, in the frequency domain, using a compensation factor. In that the compensation factor is calculated from the ratio of the (time-averaged) power spectrum of the pitch power densities of original and degraded signals. The compensation factor is never more than (i.e. clipped at) a certain pre-defined constant value, i.e., 20 dB. However in case of severe timbre differences (e.g. >20 dB in power density), such a compensation which uses a partial compensation factor between certain pre-defined constant limit values is found to result in unreliable predictions of the speech signal quality. Then it was realized that, e.g. as to timbre, the human auditory system compensates severe differences in a frequency-dependent way. More in particular, low frequencies are often compensated more than high frequencies, e.g. in normal listening rooms, due to exposure of low frequency coloration, consequently leading to the above-mentioned low correlation between the objectively predicted and subjectively experienced speech qualities. An aim of the present invention is to improve a perceptual modelling of the human auditory system in this sense.

According to one aspect of the invention, a method of the above kind comprises a step of compensating power differences of the output and reference signals in the frequency domain. The compensation step is carried out by applying a compensation factor derived from a ratio of signal values of said output and reference signals thereby using a clipping value determined by using a frequency-dependent function. The frequency-dependent function is preferably a monotonic function, which moreover preferably is proportional to a power, more particularly to a third power of the frequency.

According to a further aspect of the invention a device of the above kind comprises compensation means for compensating power differences of the output and reference signals in the frequency domain. The compensation means include means for deriving a compensation factor from a ratio of signal values of said output and reference signals have been arranged for using an at least partially frequency-dependent clipping function.

REFERENCE

[1] ITU-T Recommendation P.862 (02/2001), Series P: Telephone Transmission Quality, Telephone Installations, Local Line Networks; Methods for objective and subjective assessment of quality—Perceptual evaluation of speech quality (PESQ), an objective method for end-to-end speech quality assessment of narrow-band telephone networks and speech codecs.

The Reference [1] is incorporated by reference into the present application.

BRIEF DESCRIPTION OF THE DRAWING

The invention will be further explained by means of the description of exemplary embodiments, reference being made to a drawing comprising the following figures.

DESCRIPTION OF EXEMPLARY EMBODIMENTS

Figure 1:
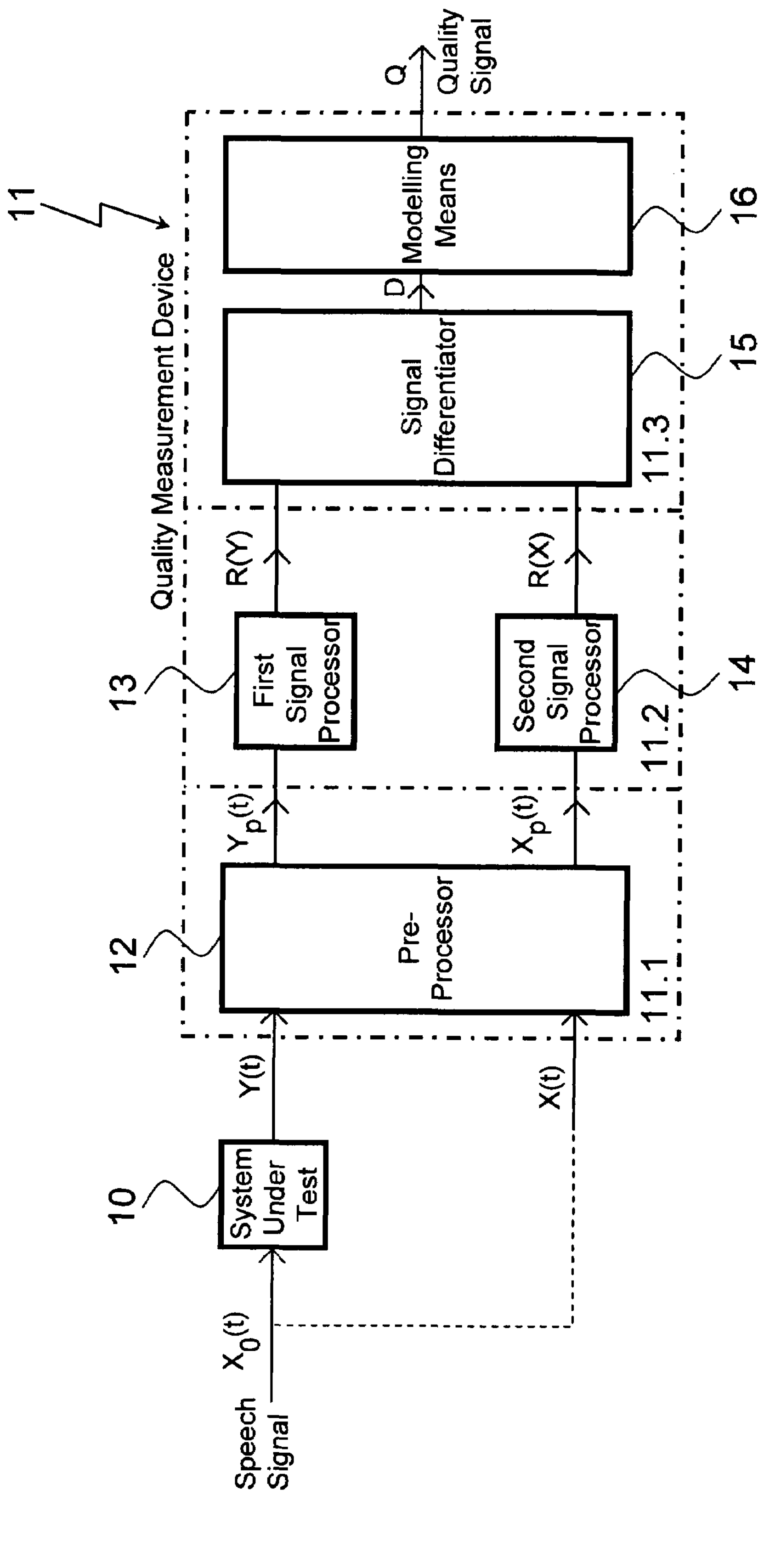
FIG. 1 schematically shows a known system set-up including a device for determining the quality of a speech signal.

FIG. 1 shows schematically a known set-up of an application of an objective measurement technique which is based on a model of human auditory perception and cognition, and which follows, e.g., the ITU-T Recommendation P.862 for estimating the perceptual quality of speech links or codecs. It comprises a system or telecommunications network under test 10, hereinafter referred to as system 10 for briefness' sake, and a quality measurement device 11 for the perceptual analysis of speech signals offered. A speech signal $X_0(t)$ is used, on the one hand, as an input signal of the system 10 and, on the other hand, as a first input signal X(t) of the device 11. An output signal Y(t) of the system 10, which in fact is the speech signal $X_0(t)$ affected by the system 10, is used as a second input signal of the device 11. An output signal Q of the device 11 represents an estimate of the perceptual quality of the speech link through the system 10. Since the input end and the output end of a speech link, particularly in the event it runs through a telecommunications network, are remote, for the input signals of the quality measurement device use is made in most cases of speech signals X(t) stored on data bases. Here, as is customary, speech signal is understood to mean each sound basically perceptible to the human hearing, such as speech and tones. The system under test may of course also be a simulation system, which simulates e.g. a telecommunications network or certain parts of such a network. The device 11 carries out a main processing step which comprises successively, in a pre-processing section 11.1, a step of pre-processing carried out by pre processing means 12, in a processing section 11.2, a further processing step carried out by first and second signal processing means 13 and 14, and, in a signal combining section 11.3, a combined signal processing step carried out by signal differentiating means 15 and modelling means 16. In the pre-processing step the signals X(t) and Y(t) are prepared for the step of further processing in the means 13 and 14, the pre-processing including power level scaling and time alignment operations, thereby outputting pre-processed signals $X_p(t)$ and $Y_p(t)$, which are, e.g., scaled versions of the reference and output signals. The further processing step implies mapping of the (degraded) output signal Y(t) and the reference signal X(t) on representation signals R(Y) and R(X) according to a psycho physical perception model of the human auditory system. During the combined signal processing step, a differential or disturbance signal D is determined by means of the differentiating means 15 from said representation signals. The differential signal D is then processed by modelling means 16 in accordance with a model, in which certain, e.g. cognitive, properties, of human test subjects have been modelled, in order to obtain the quality signal Q.

Recently, it has been experienced that current objective measurement techniques, may have a serious shortcoming in that for severe timbre differences between the reference signal and the degraded signal the speech quality of the degraded signal can not correctly be predicted. Consequently, the objectively obtained quality signals Q for such cases possess poor correlations with subjectively determined quality measurements, such as mean opinion scores (MOS) of human test subjects. Such severe timbre differences may occur as a consequence of the technique used for recording the original speech signal. A validated recording technique is, e.g., the technique known as "close miking bass boost", which involves a considerable filtering out in the low-frequency range. A further cause of severe timbre differences may be in differences in conditions, such as, with respect to reverberation between the room or area, in which the original speech signal is generated, and the room or area, in which the degraded speech signal is assessed. Room transfer functions, however, show, especially in the low frequency-domain, larger irregularities in the frequency response function than in the middle and high frequencies. The disturbances caused by such irregularities, however, are perceived less disturbing by human beings than current objective models predict.

From the basics of human perception, it is known that the human auditory system follows the rule of constancy in perception, e.g. constancy of size, of pitch, of timbre etc. This means that the human auditory system in principle can compensate, to a certain extent, for differences in size, or pitch, or timbre, etc.

Figure 2:
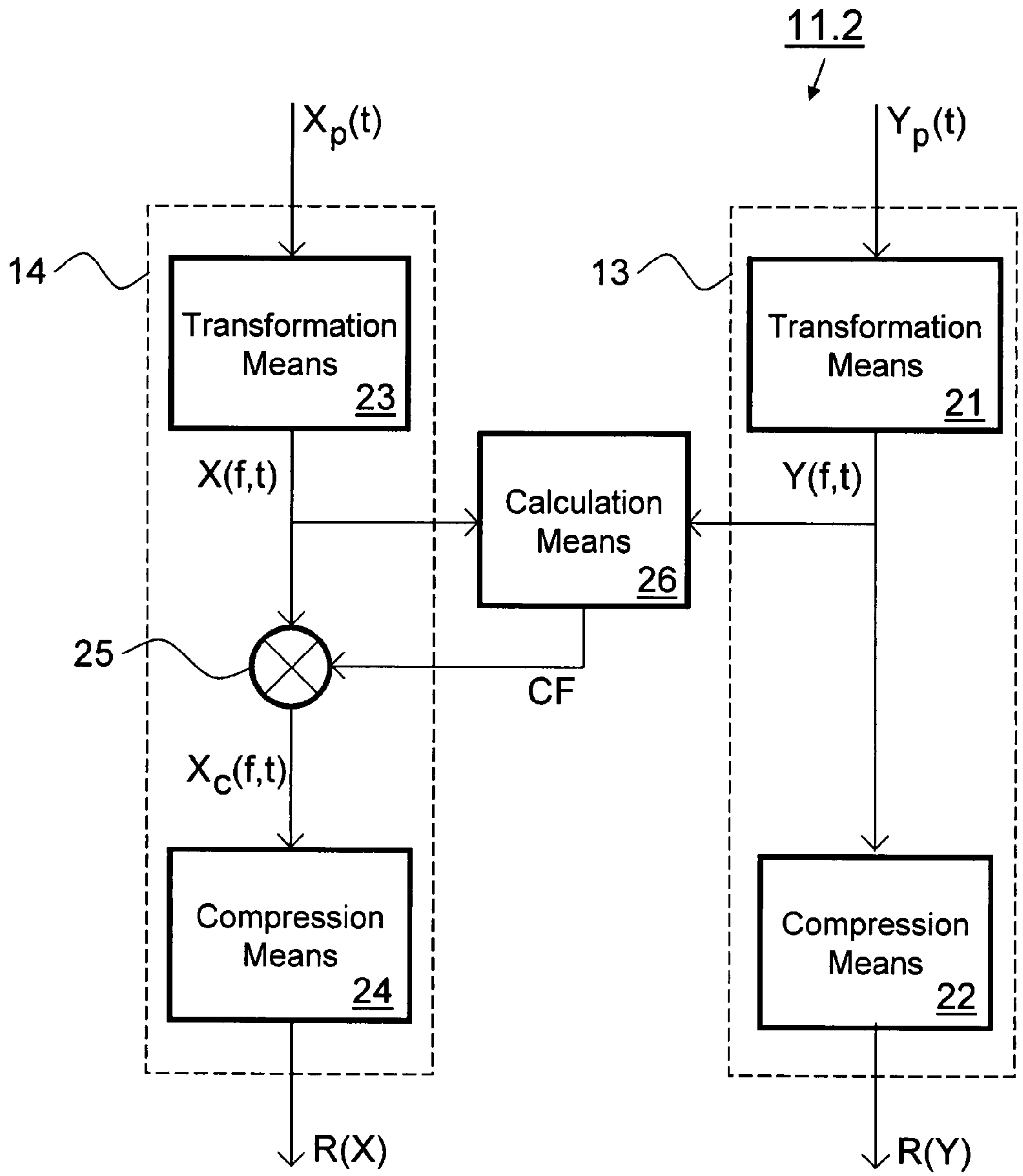
FIG. 2 shows in a block diagram, more in detail, a part of the device included in the system as shown in FIG. 1, in which a compensation operation is carried out.

Current perceptual modelling takes into account a partial compensation for some severe effects by means of a partial compensation of the pitch power density of the original (i.e. the reference) signal. Multiplying, in the frequency domain, the pitch power density of the original signal with a compensation factor (CF) carries out such compensation. FIG. 2 shows in a block diagram, more in detail, the part of the device 11 as shown in FIG. 1, i.e. the processing section 11.2, in which the compensation is carried out. The signal processing of the first signal processing means 13 includes, in a first stage, transformation means 21 in which the pre-processed degraded signal $Y_p(t)$ is transformed from a signal in the time domain into a time and frequency dependent output signal Y(f,t) in the time frequency domain, e.g. by means of an FFT (Fast Fourier Transformation), and, in a second stage, compression means 22 in which the thus transformed signal Y(f,t) is subjected to a signal compression, resulting in the representation signal R(Y). In a similar way, the signal processing of the second signal processing means 14 includes, in a first stage, transformation means 23 in which the pre-processed original signal $X_p(t)$ is transformed into a time and frequency dependent output signal X(f,t), and, a second stage, compression means 24 in which the thus transformed signal X(f,t) is subjected to a signal compression, in order to obtain the representation signal R(X). Between the two stages 23 and 24, previous to the signal compression, the transformed signal X(f,t) is subjected to a compensation operation by compensation means 25, which operation results in a compensated transformed signal $X_C(f,t)$.

The transformation of the pre-processed degraded and reference signals is preferably, as usual, followed by a so-called warping function which transforms a frequency scale in Hertz to a frequency scale in Bark (also known as pitch power density scale).

The compensation operation is carried out by means of a multiplication with a compensation factor CF, which in a calculation operation, carried out by calculation means 26, is derived from a frequency response FR(f) of the time and frequency dependent signals Y(f,t) and X(f,t), i.e. the ratio of the (time-averaged) power spectrum of the pitch power densities of the two signals. The frequency response FR(f) may be expressed by:

$$FR(f)=\int Y(f,t)dt/\int X(f,t)dt \qquad \{1\}$$

Then, the compensation factor CF is calculated from this ratio, in such a way that:

$$CF=FR(f) \text{ for } CL^- \leqq FR(f) \leqq CL^+, \quad \text{(i)}$$

$$CF=CL^- \text{ for } FR(f)<CL^-, \text{ and} \quad \text{(ii)}$$

$$CF=CL^+ \text{ for } FR(f)>CL^+, \quad \text{(iii)}$$

in which $CL^-$ and $CL^+$, respectively called lower and upper clipping values, are certain predefined constant values, at which the frequency response is clipped for getting the compensation factor CF for the above indicated partial compensation. Such clipping values are predefined, e.g., during an initialization phase of the measurement technique. For methods in accordance with Reference [1] these pre-defined clipping values $CL^-$ and $CL^+$ are 0,01 (−20 dB) and 100 (+20 dB), respectively. However, in case of severe timbre differences (e.g. >20 dB in power density), such a partial compensation which uses a compensation factor which is clipped at certain pre-defined constant values, was found to result in unreliable predictions of the speech signal quality. Then, it was found that an improvement of the perceptual modelling of the human auditory system could be achieved by carrying out the compensation using a compensation factor which is clipped no longer at constant values, but at frequency-dependent values, at least over a part, preferably the lower part, of the frequency range of the auditory system. Such frequency-dependent clipping values are hereinafter indicated by frequency-dependent functions $cl^-(f)$ and $cl^+(f)$, called lower and upper clipping function, respectively.

The compensation factor CF is again calculated from the frequency-response according to formula {1}, but clipped by using the frequency-dependent lower and upper clipping functions, in such a way that:

$$CF=FR(f) \text{ for } cl^-(f) \leqq FR(f) \leqq cl^+(f), \quad \text{(i)}$$

$$CF=cl^-(f) \text{ for } FR(f)<cl^-(f), \text{ and} \quad \text{(ii)}$$

$$CF=cl^+(f) \text{ for } FR(f)>cl^+(f). \quad \text{(iii)}$$

In principle, the upper and lower clipping functions may be chosen independently of each other. However, as a consequence of the reciprocal character of the frequency response function, the upper clipping function $cl^+(f)$ is preferably chosen to be equal, at least approximately (see below), to the inverse (reciprocal) of the lower clipping function $cl^-(f)$, or vice versa.

A clipping function, e.g., the lower clipping function $cl^-(f)$, is, at least over the part or parts which are frequency dependent, preferably monotonic either increasing or monotonic decreasing with increasing frequency, whereas in a corresponding way the other clipping function is monotonic decreasing or increasing. The clipping functions are preferably pre-defined, e.g., during an initializing phase of the measurement system.

By means of a suitable choice of the upper and lower clipping functions, the partial compensation can be brought into better harmony with the above mentioned rule of constancy in perception. Experimentally, it appeared that a monotonic increasing function which is proportional to the a power p of the frequency, i.c $f^p$ (with $p \neq 0$), especially in the low frequency range, is such a suitable choice for the lower clipping function. Preferably p=3. Hereinafter, the difference in choice of such frequency-dependent clipping functions, $cl^-(f)$ and $cl^+(f)$, instead of constant clipping values $CL^-$ and $CL^+$ is illustrated with reference to figure FIG. 3.

Figure 3:
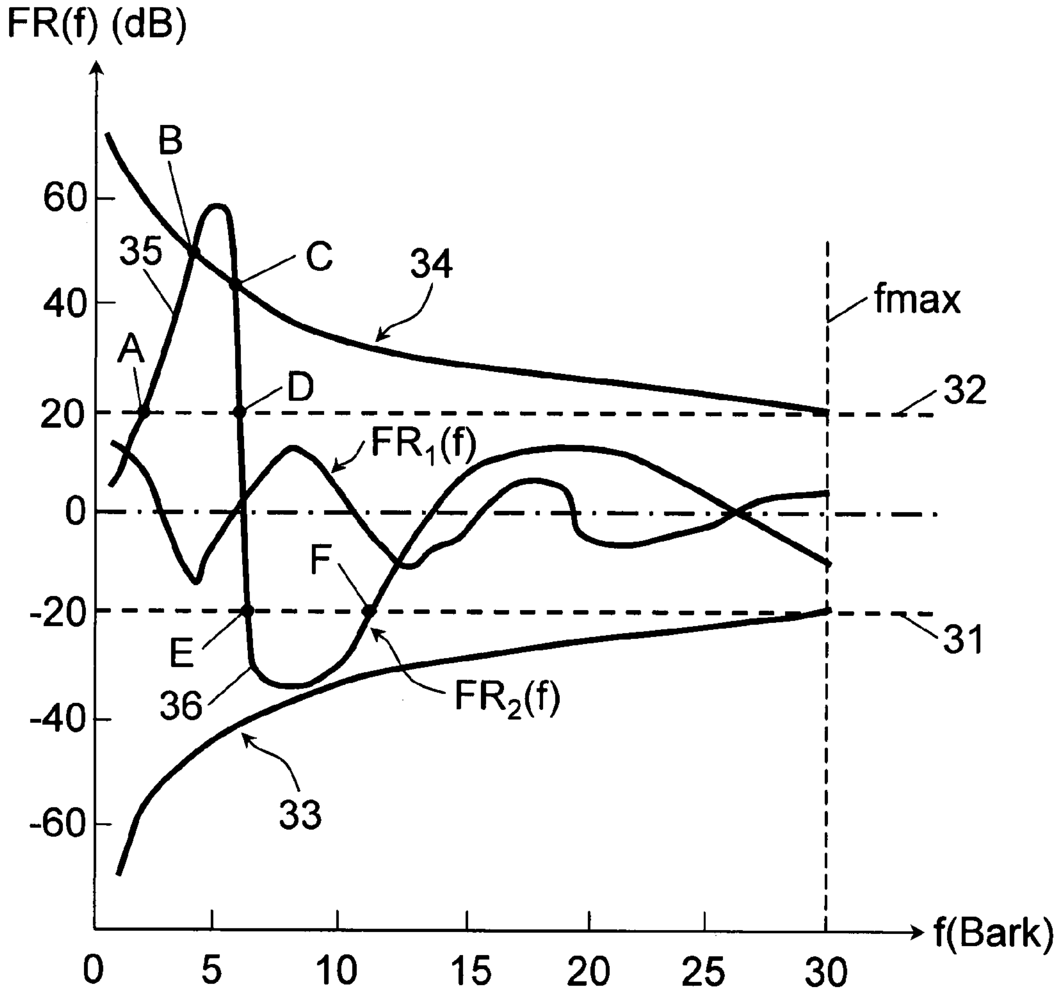
FIG. 3 shows a graphical diagram for illustrating an essential difference in determining a compensation factor for a compensation operation between the prior art using constant upper and lower clipping values, and the present invention using a first set of frequency-dependent upper and lower clipping values.

FIG. 3 shows in a graphical diagram, as an example, the frequency response function for first and second, mutually different speech signals, indicated by $FR_1(f)$ and $FR_2(f)$, respectively, the frequency response values (in dB) being put along the vertical axis as a function of the frequency (in Bark) being put along the horizontal axis. The horizontal broken dashed lines 31 and 32 at −20 dB and +20 dB indicate the constant clipping values $CL^-$ and $CL^+$, respectively. The curved lines 33 and 34 indicate the frequency-dependent lower and upper clipping functions $cl^-(f)$ and $cl^+(f)$, respectively. The frequency response functions $FR_1(f)$ and $FR_2(f)$ have no significant values for frequencies above a certain $f_{max}$, which is about 30 Bark for the human auditory system.

As an example, the plotted lower and upper clipping functions, indicated by the curved lines 33 and 34, are chosen as:

$$cl^-(f)=CL^-\{f/f_{max}\}^3 \text{ and } cl^+(f)=\{cl^-(f)+\Delta\}^{-1}$$

in which Δ is a small number (e.g. 0.015) in order to avoid too large values for $cl^+(f)$ in cases where $cl^-(f) \approx 0$ for any value of f.

In this example, the frequency response function $FR_1(f)$ lies completely in between of both the constant clipping values $CL^-$ and $CL^+$ and the clipping functions. The function $FR_2(f)$ however has, in addition to points between the constant clipping values $CL^-$ and $CL^+$, a first lobe 35 in the upward direction, which between points A and D increases above the horizontal line 32, and between points B and C increases even above the curved line 34. It has moreover a second lobe 36 in the downward direction, which between points E and F decreases below the horizontal line 31.

For speech signals having a frequency response function completely lying in between of both the set of clipping values and the set of clipping functions, such as the function $FR_1(f)$, there will be no difference in determining the compensation factor CF, since there is no need for clipping. For speech signals having a frequency response function which partially lies in between the set of clipping values, and which has one or more lobes such as the function $FR_2(f)$, there will be a considerable difference in determining the compensation factor CF. For calculating the compensation factor CF according to the prior art method, the values of the frequency response function $FR_2(f)$ between the points A and D are clipped to the upper clipping value $CL^+$, whereas according to the new method only the values of the frequency response function $FR_2(f)$ between the points B and C are clipped, not only to the locally much larger values according to the upper clipping function $cl^+(f)$, but moreover in a frequency-dependent way. In a similar way, the values of the frequency response function $FR_2(f)$ between the points E and F are clipped to the lower clipping value $CL^-$, whereas according to the new method the values of the frequency response function $FR_2(f)$ between the points E and F are not clipped at all.

Another choice for $cl^-(f)$ may be:

$$cl^-(f)=\{f/f_C\}^3 \text{ for } f \leqq f_A=\{CL^-\}^{1/3}f_C \text{ and}$$

$$cl^-(f)=CL^- \text{ for } f \geqq f_A=\{CL^-\}^{1/3}f_C.$$

Figure 4:
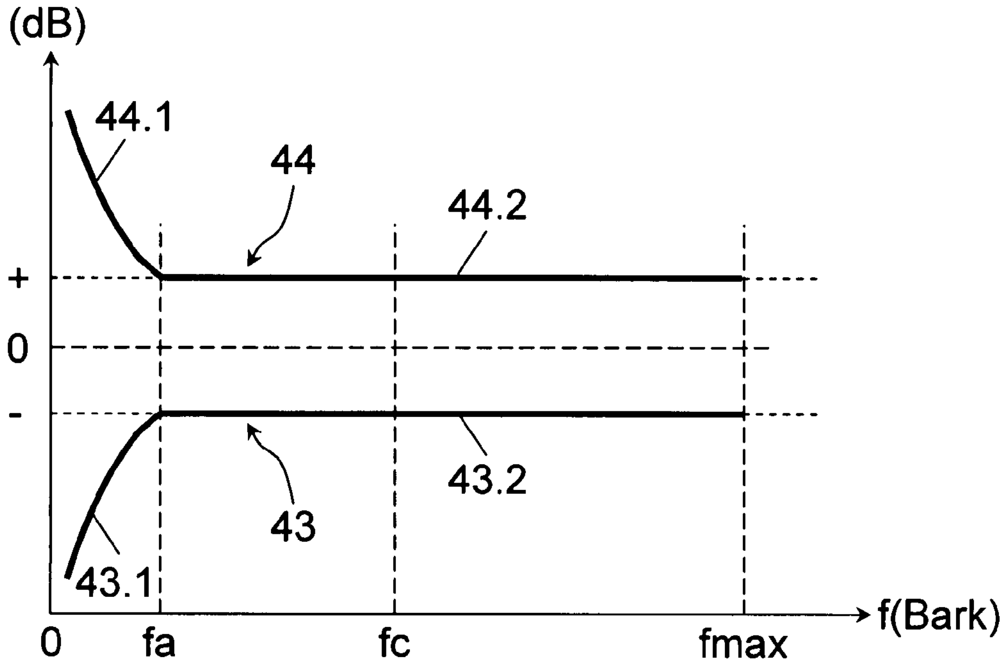
FIG. 4 shows a graphical diagram picturing a second set of frequency-dependent upper and lower clipping values.

$f_C$ is a center frequency (i.e. $f_{max}/2 \approx 15$ Bark) of the frequency range of the human auditory system. This choice for $cl^-(f)$ with corresponding $cl^+(f)$ is pictured in figure FIG. 4. The lower and upper clipping functions are indicated by numerals 43 and 44, respectively, each having a frequency-dependent part 43.1 (44.1), and a constant value part 43.2 (44.2). In particular this choice showed, for speech signals with large timbre differences, experimentally an increase in correlation of more than 5% between the predicted quality and the subjectively measured quality.

More generally, the lower clipping function may be a concatenation of frequency-dependent parts over successive frequency ranges in the direction of increasing frequency, each part being a monotonic increasing function which has a still lower frequency-dependency over the successive frequency ranges. For example, the parts are functions proportional with a power of the frequency, which power decreases for each following frequency range in the direction of increasing frequency. For example, a first part proportional with the already mentioned function $f^3$ in the lowest frequency range, followed by a second part proportional $f^2$ in a second next frequency range, followed by a third part proportional with $f^{2/3}$ in a third next range, etc.

Still another choice reckons with symmetry in frequency spectrum of the auditory system:

$$cl^-(f)=\{f/f_C\}^3 \text{ for } f\leqq f_A=\{CL^-\}^{1/3}f_C,$$

$$cl^-(f)=\{(f_{max}-f)/f_C\}^3 \text{ for } f\geqq f_B=f_{max}-\{CL^-\}^{1/3}f_C, \text{ and}$$

$$cl^-(f)=CL^- \text{ for } f_A\leqq f\leqq f_B.$$

Figure 5:
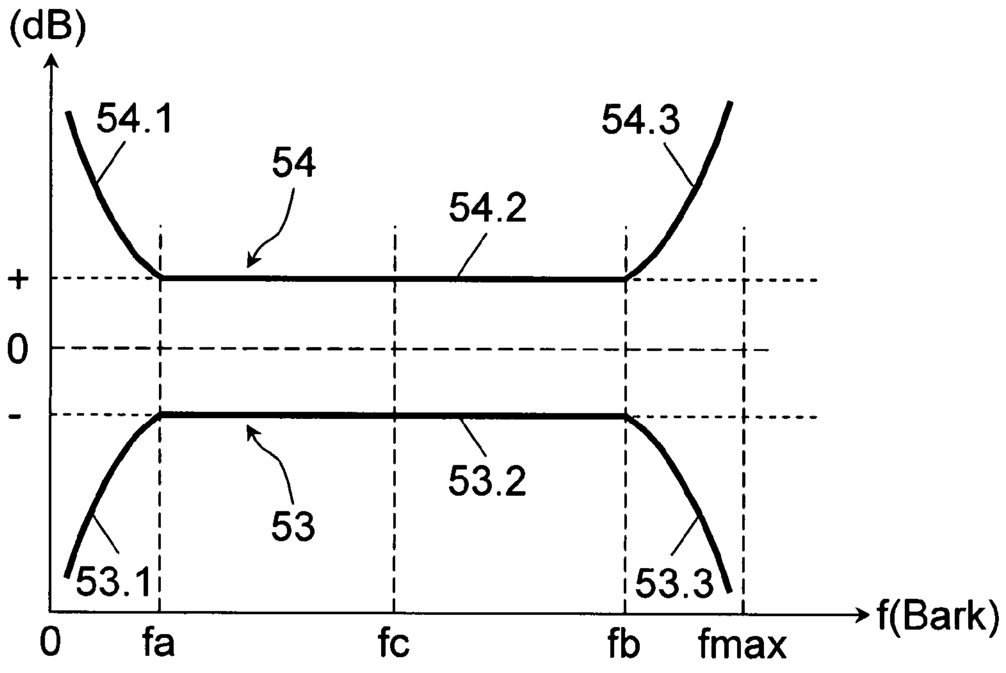
FIG. 5 shows a graphical diagram picturing a third set of frequency-dependent upper and lower clipping values.

This choice for $cl^-(f)$ with corresponding $cl^+(f)$ is pictured in figure FIG. 5. The lower and upper clipping functions are indicated by numerals 53 and 54, respectively, each having successively a first frequency-dependent part 43.1 (44.1) in the low frequency range, an intermediate constant value part 43.2 (44.2), and a second frequency-dependent part 43.3 (44.3) in the high frequency range.

Instead of the transformed signal X(f,t), the transformed signal Y(f,t) may be subjected to the compensation operation, the compensation factor being calculated from a frequency response function which in fact is the reciprocal of the frequency response FR(f) as expressed by formula {1}.

The invention claimed is:

1. A method for determining, according to an objective speech measurement technique, quality (Q) of an output signal (Y(t)) of a speech signal processing system with respect to a reference signal (X(t)), the method comprising the step of: compensating power differences of the output and reference signals in a frequency domain by applying a compensation factor (CF) derived from a ratio of signal values of said output and reference signals and through use of a frequency-dependent clipping function.

2. The method recited in claim 1 wherein the compensation factor is derived using upper and lower clipping values, both of the upper and the lower clipping values being determined by the frequency-dependent function.

3. The method recited in claim 2 wherein the clipping value, derived from said frequency-dependent function, is symmetric with respect to a center frequency of a frequency range of a human auditory system.

4. The method recited in claim 1 wherein a frequency-dependent value for the clipping value, the clipping value being less than a center frequency ($f_C$) of a frequency range ($0\leqq f\leqq f_{max}$) of a human auditory system, is derived from a monotonically increasing, frequency-dependent function.

5. The method recited in claim 4 wherein the monotonically increasing, frequency-dependent function is proportional to a power of the frequency.

6. The method recited in claim 5 wherein the monotonically increasing, frequency-dependent function is proportional to a third power of the frequency.

7. The method recited in claim 5 wherein the monotonically increasing, frequency-dependent function is proportional to a power of the ratio of the frequency and the center frequency.

8. The method recited in claim 4 wherein the monotonically increasing, frequency-dependent function is proportional to a power of a ratio of the frequency and the center frequency.

9. The method recited in claim 1 wherein, with respect to a center frequency of a frequency range of a human auditory system, a measure of frequency-dependency of the frequency-dependent function is higher for frequencies, less than the center frequency, than for frequencies greater than the center frequency.

10. The method recited in claim 1 wherein the frequency-dependent value for the clipping value, the clipping value being less than a center frequency ($f_C$) of a frequency range ($0\leqq f\leqq f_{max}$) of a human auditory system, is derived from a monotonically increasing, frequency-dependent function.

11. A device for determining, according to an objective speech measurement technique, quality (Q) of an output signal (Y(t)) of a speech signal processing system with respect to a reference signal (X(t)), wherein the device comprises: means for compensating power differences of the output and reference signals in a frequency domain, the compensation means having means for deriving a compensation factor (CF) from a ratio of signal values of said output and reference signals and through use of a frequency-dependent clipping function.

12. The device recited in claim 11 wherein the deriving means is responsive to frequency-dependent lower and upper clipping functions.

* * * * *